United States Patent [19]

Sadler

[11] Patent Number: 5,784,872
[45] Date of Patent: Jul. 28, 1998

[54] TRASH PICK-UP AND COLLECTION SYSTEM

[75] Inventor: Lee Frank Sadler, Lexington, Ky.

[73] Assignee: Sadler Inventions, Inc., Lexington, Ky.

[21] Appl. No.: 846,379

[22] Filed: Apr. 30, 1997

[51] Int. Cl.$^6$ .............................. A01D 43/02; E01H 15/00
[52] U.S. Cl. ............... 56/364; 56/400.02; 56/400.03; 15/83; 15/84; 172/21; 172/554
[58] Field of Search ................. 56/400.02, 1, 2, 56/364, 362, 228, 400.03; 15/82, 83, 84; 172/21, 22, 554; 171/63

[56] References Cited

U.S. PATENT DOCUMENTS

| | | |
|---|---|---|
| 2,513,480 | 7/1950 | Heth . |
| 3,746,099 | 7/1973 | Black . |
| 3,807,154 | 4/1974 | Moore . |
| 3,934,390 | 1/1976 | Ballard . |
| 3,993,141 | 11/1976 | Donohue .................. 56/328 X |
| 4,561,240 | 12/1985 | Moore et al. . |
| 4,608,725 | 9/1986 | Jackson . |
| 4,974,406 | 12/1990 | Russ . |
| 4,981,013 | 1/1991 | Underwood ............... 56/364 X |
| 5,274,989 | 1/1994 | NG . |

*Primary Examiner*—Heather Shackelford
*Attorney, Agent, or Firm*—King and Schickli

[57] ABSTRACT

A trash pick-up and collection apparatus includes a rotary drum assembly with a plurality of spikes to impale and pick-up the trash along a path to be cleared. A continuous chain mechanism wrapped around the drum assembly lifts, strips and carries the trash to a collection bin. The drum assembly includes a plurality of sections in the direction of the longitudinal axis to allow ease of movement in a turn. The drum is formed of elongated plates extending in the longitudinal direction and each mounts a series of spikes. The chain mechanism preferably includes a plurality of flattened chains that lift the trash from underneath and carry it to the collection bin. An idler roller positioned adjacent the collection bin forms the delivery and return run of the chains. The entire apparatus may be lifted over obstacles and moved along paved roads by wheels that are hydraulically moved to and from an operative position. The trash is deposited directly into plastic bags through an opening in the side of the collection bin. Glass items are manually picked-up by the operator before reaching the drum assembly.

20 Claims, 5 Drawing Sheets

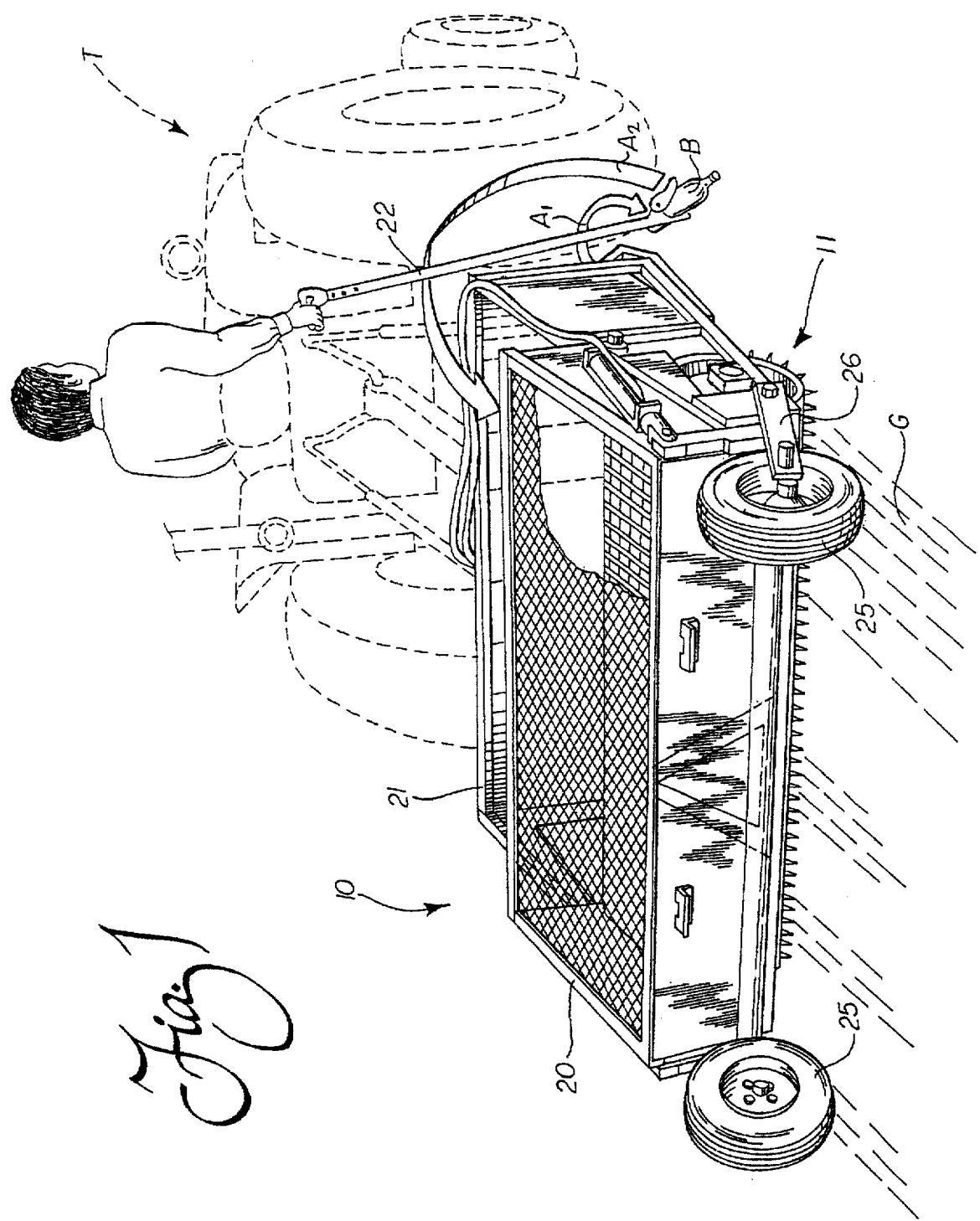

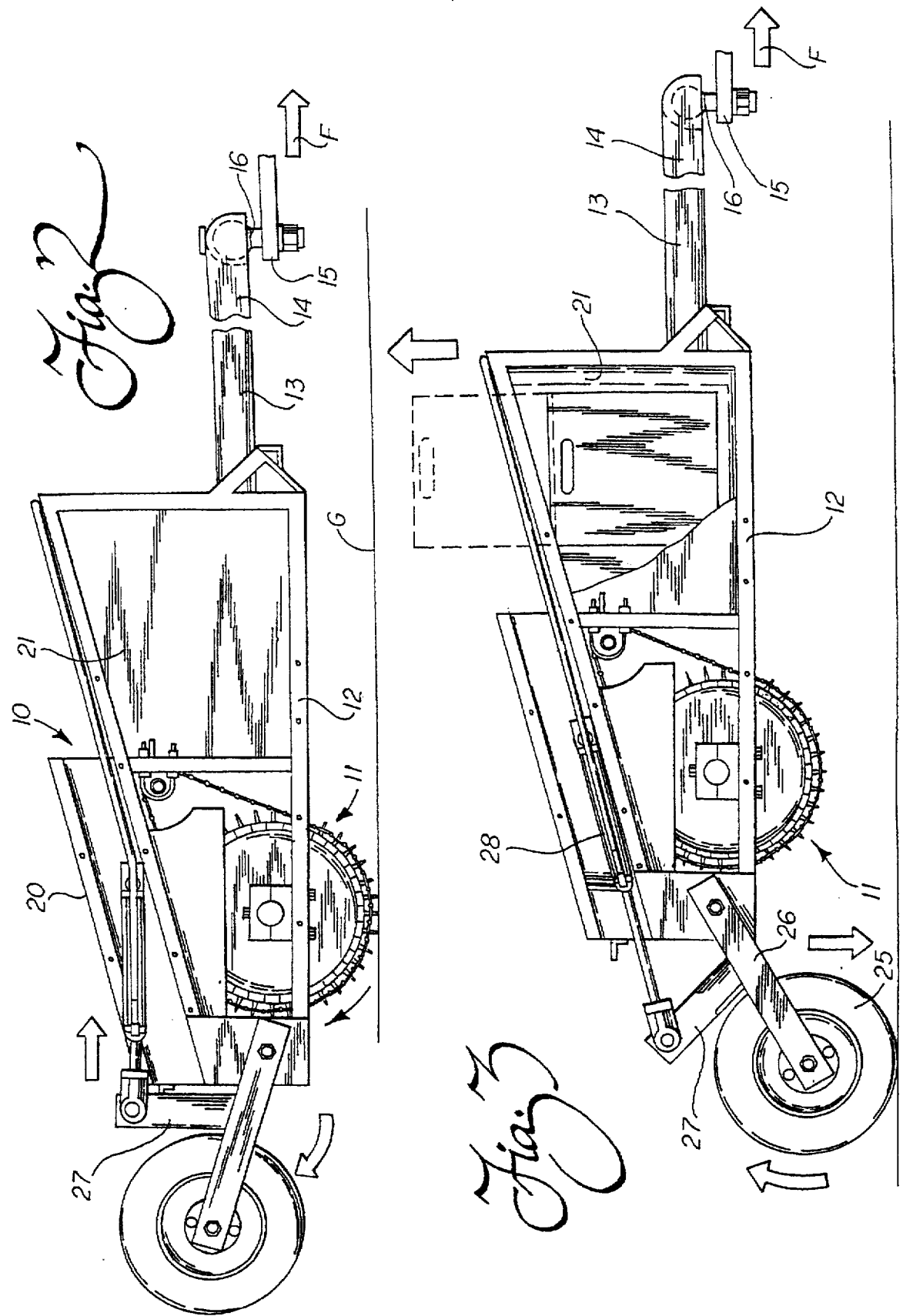

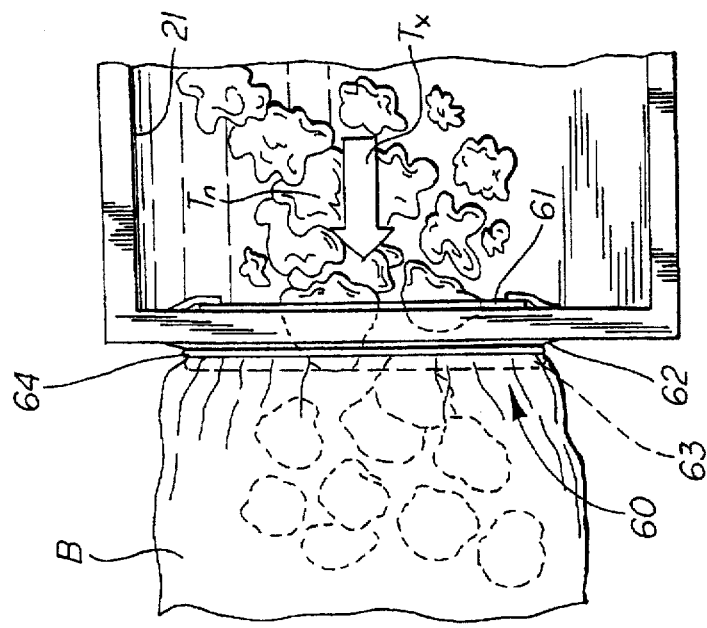
Fig. 7
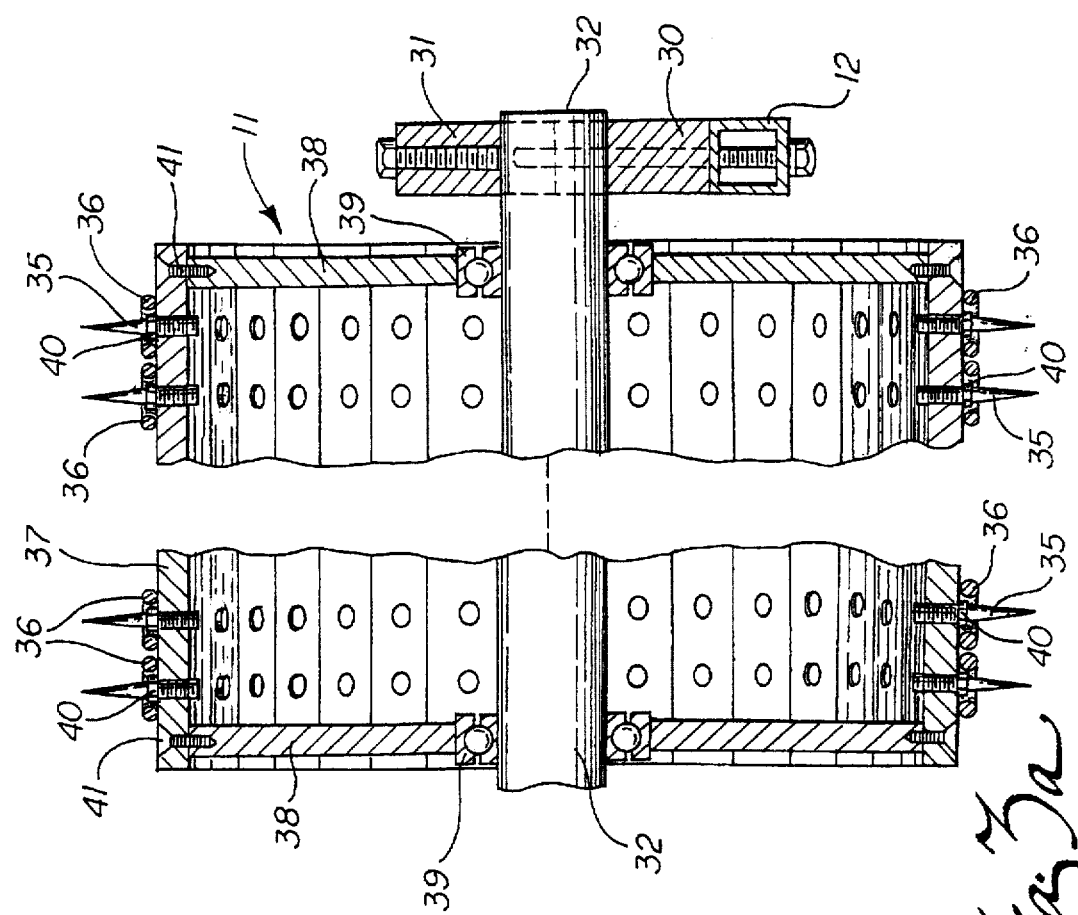
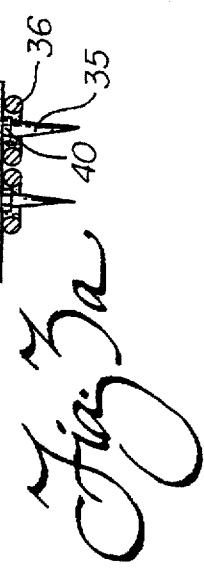
Fig. 3a

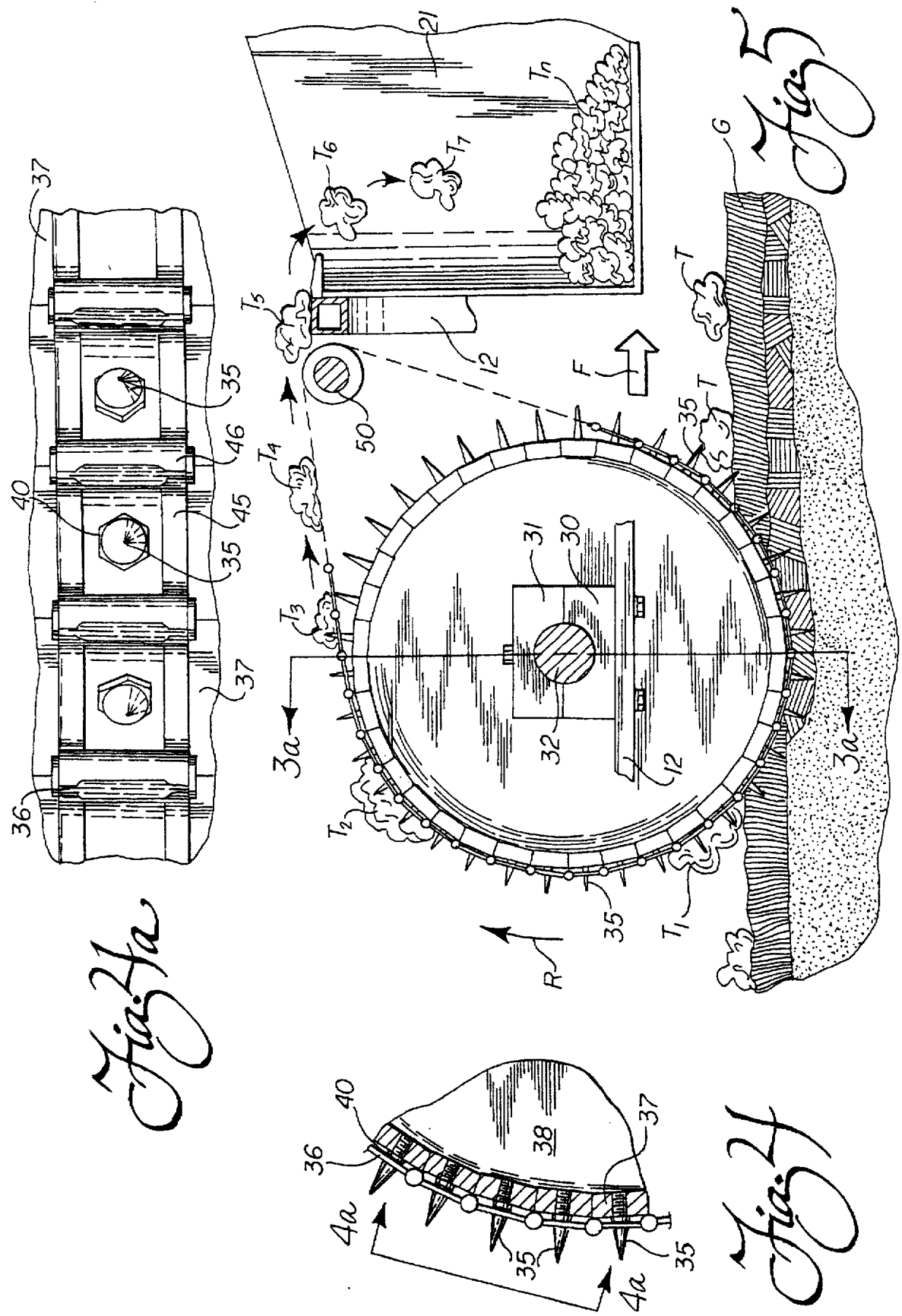

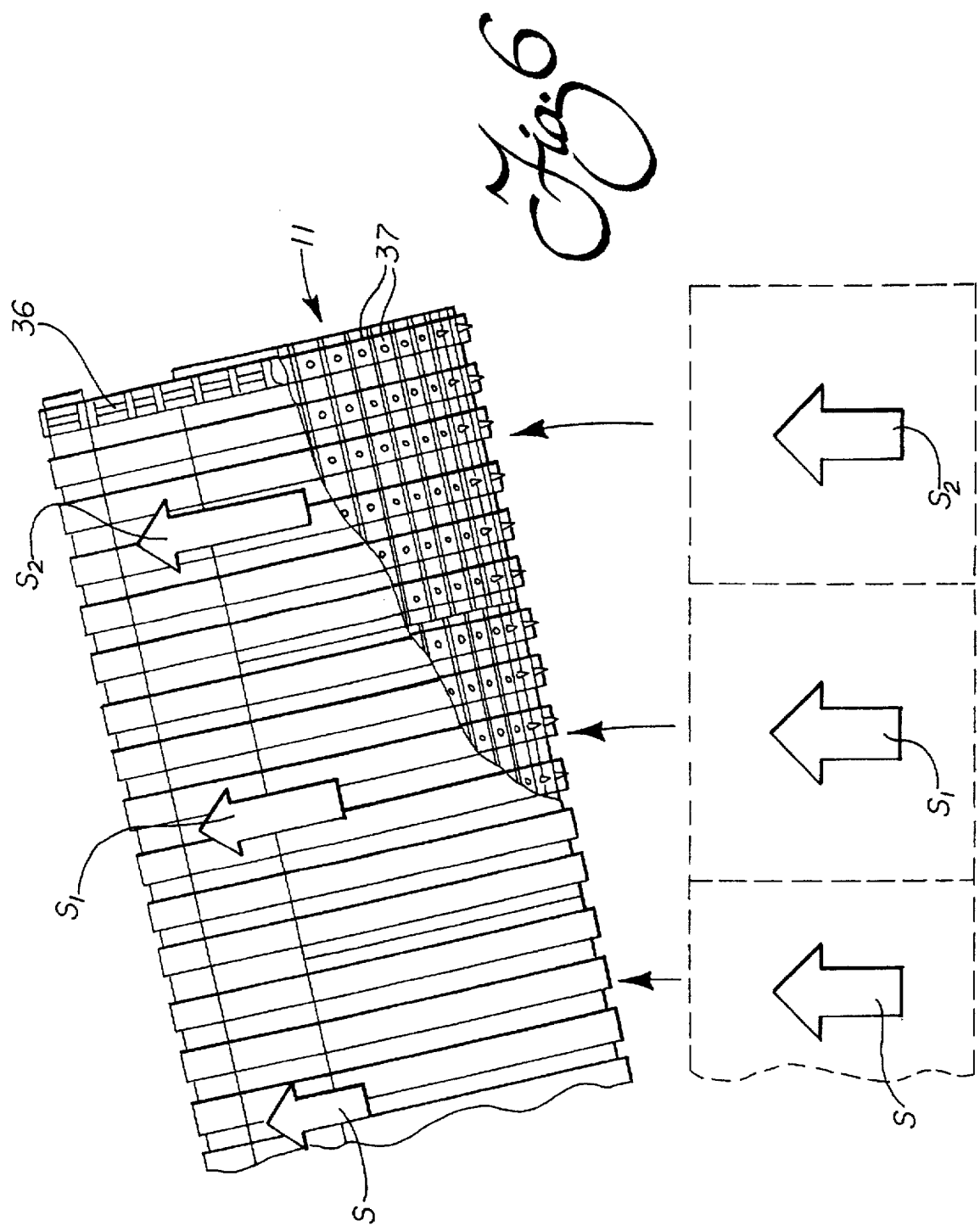

TRASH PICK-UP AND COLLECTION SYSTEM

BACKGROUND OF THE INVENTION

The present invention relates to trash pick-up and collection, and more particularly to an improved mechanized system and method utilizing a spiked drum for pick-up with a mechanism for stripping of the trash and collecting it.

BACKGROUND ART

Along highway right-of-ways, there is an increasing problem of removing trash that has been thoughtlessly thrown out by motorists that are traveling along the highway. The trash ruins the aesthetic appearance of the otherwise appealing countryside. The usual manner of trying to alleviate the problem is to have work crews manually pick-up the trash, deposit the trash in plastic bags and leave bags along the right-of-way for pick-up. As will be apparent, this operation is highly labor intensive and thus very expensive.

Furthermore, having workers walking along the right-of-way and bending over to pick-up trash is considered dangerous since it is more difficult for motorists, especially when travelling at high speeds, to observe such a person. It is generally acknowledged that a tractor because of its larger size, and with warning lights and an attached mower or the like, is easier to spot and thus for motorists to avoid in a work zone.

In addition to the problem of trash on highway right-of-ways, ball fields, picnic areas and public parks also suffer the problem of unsightly trash, especially after special events are held. Again, it is a problem to marshal a sufficient number of people, not to mention the expense, to clean up after the crowd has left.

For a long time, there has been an effort to mechanize the trash pick-up and collection process for the very reasons given above. Some of the more serious efforts have focused on devices that are designed to be operated by hand. Since these devices are still relatively small, there is no perceptive improvement in the safety aspect over the standard manual pick-up operation. Also, these devices are so small that use along an extended highway right-of-way is not practical. There is very little increase in efficiency except in small areas, such as in a private yard, with a relatively high concentration of trash or other debris, such as leaves.

Representative hand operated pick-up devices utilize a spiked drum, such as the Ballard U.S. Pat. No. 3,934,390 with retractable spikes to strip the trash. A similar arrangement is employed in the Black U.S. Pat. No. 3,746,099, but wherein is added the convenience of a collection bin to receive the trash. A series of static prongs extend between the spikes on the drum to make an effort to strip the trash, whereupon it is to be deposited in a bin. This patent also advances the concept of pulling the entire apparatus by a tractor so as to alleviate the substantial manual effort required.

In the following years, other efforts have been made to improve the efficiency of operation of basic tractor drawn pick-up/collection machines. Representative patents of this type are U.S. Pat. Nos. 4,561,240 and 4,608,725. While some increase in efficiency has been gained, there is a substantial increase in complexity of these machines. This factor is generally considered to override the limited efficiency gains because of the substantial increase in initial cost and the accompanying increase in maintenance.

Furthermore, one of the key shortcomings of all of the prior art, as represented by these four prior art patents, is the lack of reliability in stripping the trash from the rotating drum and efficiently carrying the trash after being stripped into the collection bin. The lack of positive mechanized features to accomplish these results leaves the prior art systems with much to be desired.

DISCLOSURE OF THE INVENTION

Thus, with the above needs for improvement in a mechanized pick-up and collection apparatus for trash in focus, is a primary object of the present invention to provide a simplified, combined trash/collection apparatus and method that is more efficient in capturing the trash, as well as carrying the trash for deposit into a collection bin.

It is another object of the present invention to provide a spiked drum pick-up arrangement having a chain mechanism for cooperation with the spikes for lifting, stripping and carrying the trash from the spikes to a collection point.

It is still another object of the present invention to provide a pick-up and collection arrangement wherein the drum is made up of longitudinally extending plates, each supporting a series of spikes and a plurality of chains being wrapped around the drum and cooperating with circular rows of spikes in such a manner as to efficiently lift the trash from underneath, strip the trash and then carry the trash on a delivery run of the chains away from the drum and into a collection bin.

It is still another object of the present invention to provide a trash pick-up and collection arrangement wherein the trash is collected in a large bin and is moved directly into individual plastic bags through a side opening.

It is still another object of the present invention to provide a corresponding method for efficient pick-up of trash, stripping and depositing of the trash in a collection bin.

It is still another object of the present invention to provide a method for trash pick-up and collection that involves efficient handling of the trash and including separate handling of glass items.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved trash pick-up and collection apparatus is provided for travel along a path to be cleared, such as along highway right-of-ways, ball fields, picnic grounds and parks. The apparatus includes a rotary drum assembly having a plurality of spikes around its periphery for impaling and picking-up the trash when lowered into position on the ground along the path. A continuous chain mechanism is wrapped around the drum assembly so as to lift, strip and carry the trash from the spikes. A collection bin receives the trash carried by the chain as the chain moves away from the periphery of the drum. Thus, the pick-up, stripping, carrying and depositing of the trash in the collection bin, is provided in a simple, inexpensive and highly efficient and positive manner not heretofore known in the prior art.

The drum assembly includes a plurality of sections extending in the longitudinal direction. Each of the sections provides for separate movement from the others in order to provide differential speeds of the sections in a turn. The sections of the drum assembly are individually mounted for substantially free rotation on a stationary mounting shaft supported by the frame of the apparatus. Preferably, the shaft is hardened steel of at least 2 inches in diameter to resist deflection either under load during the pick-up operation or when the drum assembly is lifted for clearance.

The chain mechanism is preferably formed of a plurality of chains spaced longitudinally along the drum assembly and cooperating with a circular row of spikes formed by at least one spike of each series of spikes mounted on the elongated plates; the plates forming the outer circumferential surface of the sections. A guide spaced from the drum assembly directs the chains away from the surface and toward the collection bin thus forming a delivery run. As the chains leave the circumferential surface of the drum assembly, the trash is efficiently lifted from underneath and carried in a positive manner away from the drum assembly for collection in the bin.

The collection bin extends along the length of the drum assembly and is adjacent the distal end of the delivery run of the chains. After depositing the trash in the bin, the chains continue around the guide, which can be an idler roller, and resume wrapping around the pick-up drum assembly to continue the pick-up and stripping operation in a continuous fashion.

In order to avoid obstacles along the path, a pair of rubber tired wheels can be lowered into engagement with the ground to lift the drum assembly for clearance. This operation is provided by pivotal swing arms that mount the wheels. The raising operation is provided by a hydraulic cylinder for each of the arms.

In order to provide for efficient removal of the trash from the collection bin, an opening is provided in one of the sidewalls. A door is provided to close the opening during the pick-up operation. A collar around the opening is used to attach the plastic bags as the trash is raked out of the bin and into the bag.

Preferably, the spikes on the drum assembly are sufficiently long to extend down into the soil layer of the sod along the path to provide the extra benefit of aeration during the pick-up operation.

In the related method of the present invention, the steps include moving a rotary drum assembly along a path to be cleared, the drum assembly having a plurality of spikes to impale and pick-up the trash during rotation. Next, a continuous chain mechanism is wrapped around the drum assembly for lifting, stripping and carrying the trash from the spikes. The trash is then collected for disposal. In the preferred method, a plurality of chains is provided and the chains are guided away from the drum assembly by an idler roller. The collection step includes carrying the trash into the bin by movement of the chains. Advantageously, breakage of glass items by the spiked drum assembly is avoided by separate manual pick-up by the operator for depositing in the collection bin or in a separate receptacle. The trash in the bin is then raked through an opening in the side of the bin directly into a plastic bag for disposal.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

FIG. 1 is a perspective view of the trash pick-up and collection apparatus that is shown in combination with a tractor (dashed line outline) and illustrated in the operative position in engagement with the ground;

FIG. 2 is a side elevational view of the pick-up/collection apparatus illustrated in the same operative position as in FIG. 1 and with the attachment to a ball-type hitch of the tractor;

FIG. 3 is a side view similar to FIG. 2 but with the pick-up/collection apparatus raised by auxiliary wheels for clearance of an obstacle;

FIG. 3a is a longitudinal, broken away cross section of a single section of the drum assembly illustrating the mounting of the elongated plates and longitudinal series of spikes on the outer circumferential surface;

FIG. 4 is an enlarged partial view in transverse cross section of the drum assembly showing the chain mechanism wrapped around a section of the circumferential surface and matching with the spikes in a circular row;

FIG. 4a is a partial plan view of the chain and the spikes as seen in the direction of arrows 4a—4a in FIG. 4;

FIG. 5 is an end view of the drum assembly illustrating the manner in which it moves along the path in a sodded area to pick-up trash on the spikes, strip and convey the trash in a positive manner to the collection bin, and at the same time provide aeration of the soil;

FIG. 6 is a top schematic view illustrating the manner in which the separate sections of the drum assembly can move in differential speeds around a turn; and FIG. 7 is a partial view cut away for clarity showing the manner in which the trash is raked from the collection bin into an attached plastic trash bag for disposal.

DETAILED DESCRIPTION OF THE INVENTION

Reference is now made to FIG. 1, illustrating a preferred embodiment of the combined trash pick-up and collection apparatus 10 made in accordance with the principles of the present invention. Considering this Figure, along with FIG. 2 of the drawings, it can be seen that a drum assembly, generally designated by the reference numeral 11, is positioned so as to define a path along ground G where trash is to be picked up and collected. The pick-up/collection operation can be considered to be along grassy areas of highway right-of-ways or similar areas, but of course a satisfactory operation can also be on bare ground.

In the preferred embodiment and as illustrated in these two illustrations, the pick-up/collection apparatus 10 is being towed by a tractor, illustrated in dashed-line outline and designated generally by the reference numeral T. An operator drives the tractor and also manipulates the simple controls for raising and lowering the pick-up/collection apparatus 10 (compare FIGS. 2 and 3), making for a highly efficient operation. The operator using the pick-up/collection apparatus 10 of the present invention is capable of performing the work of many persons performing a similar operation by hand, and with much less physical effort and fatigue.

At the same time, because the apparatus 10 can include a standard warning triangle on the back and the tractor can operate with flashing lights in the usual manner, substantial additional safety is available for the operator. As illustrated, the standard roll-bar and other safety features are omitted, but are understood to be used in the preferred embodiment of trash pick-up/collection operation of this invention.

As illustrated, the pick-up/collection apparatus 10 of the preferred embodiment includes a frame 12 having a towing tongue 13 to which is attached a hitch receiver 14. The best towing arrangement is provided by a simple hitch bar 15 mounted on the tractor T which carries a hitch ball 16. This allows the entire pick-up/collection apparatus 10 to not only turn, but also adjust its level/tilt position from side-to-side during operation.

The frame 12 is fabricated of tubular steel, and includes sheet panels for enclosing the drum assembly from the back and the sides (see FIGS. 1 and 2). Supported by the enclosing panels on the frame 12 is a removable cover 20 fabricated of expanded metal in order to provide protection for the operator and others. Forward of the drum assembly 11 and the cover 20 is a collection bin 21. As will be seen more in detail below, as the pick-up/collection apparatus 10 is towed along a path to be cleared, such as on the ground G, the drum assembly 11 rotates clockwise (as seen in FIG. 2) due to its engagement on the ground G. In this manner, the pick-up/collection apparatus is self operating and needs no separate rotary power input. The drum assembly picks up the trash, which is then carried or conveyed in a positive manner and deposited in the collection bin 21.

As the operator drives the tractor T along the path being cleared, any glass item, such as the occasional glass bottle B, is spotted and the tractor T is steered to place the bottle between the wheels in order to prevent it from being broken. The operator then manipulates the manual retriever wand 22 to actuate the handle grip to grasp the bottle B. The bottle is then first brought outwardly from between the wheels, as indicated by the movement arrow $A_1$, and then is swung generally along an upward path $A_2$ for depositing the bottle B in the collection bin 21. The operator pauses the tractor momentarily during this operation. If desired, a special receptacle hanging on the tractor can be used for placement of the bottle B, and thus for separate collection of glass items. As will be apparent, upon releasing the handle grip of the wand 22, the clamp at the bottom is opened allowing the bottle B to drop into the selected collection container.

As illustrated in FIGS. 1–3, the pick-up/collection apparatus 10 includes a pair of pneumatic tired wheels 25 that are mounted for pivoting action on individual swing arms 26 (only the near side arm 26 shown in the Figures). A lever 27 attached to each arm 26 is operated by a hydraulic cylinder 28 to bodily move the wheels 25, either up for the trash pick-up/collection operation, as illustrated in FIG. 2, or down, as illustrated in FIG. 3 for avoiding obstacles, or for travel over a paved road. In this manner, the drum assembly 11 is protected from damage and undue wear.

Moving now to FIG. 3a of the drawings, a more detailed view and understanding of the drum assembly 11 can be provided. For illustrative purposes, only the near end section of the drum assembly is illustrated. In addition, this illustration is cut-away for clarity and to save space. Thus, it can be seen that the frame 12 supports a pair of mounting blocks 30, 31 for each end of the support shaft 32 (only one end shown, but see also FIGS. 5 & 6). In order to support the drum assembly 11 without undue deflection, the shaft 32 is preferably hardened steel and is at least 2" in diameter.

The rotary drum assembly 11 has a plurality of spikes 35 that are used to impale and pick-up the trash along the path being cleared. Wrapped around the drum assembly 11 is a flexible trash removing mechanism, preferably in the form of a plurality of chains 36 that in concert form a continuous chain mechanism for removing the trash for collection in the unique manner described. The spikes 35 are preferably gang mounted in a longitudinal series extending across individual elongated plates 37. These plates 37 are, in turn, mounted on support discs 38 on roller bearings 39 carried by the stationary shaft 32. Thus, during operation as the spikes engage the ground G (see FIGS. 2 & 5) the sections of the drum assembly 11 are substantially free rotating allowing trash in their path to be impaled and retained on one or more of said spikes for lifting from the ground G.

The spikes 35 are hardened steel to provide ruggedness and long life. In service, the spikes are allowed to become rusted to provide a roughened surface to retain the trash as it is lifted until it is positively stripped away. If desired, annular grooves can be formed in the surface for even better retention. Each spike is threaded into the corresponding elongated plate 37 and locked in place by a hex-head 40. If desired, a lock washer, or other locking means can be used to assure retention of the spikes on the plates 37. The plates are individually mounted by screws 41 extending into the outer periphery of the support discs 38, which also can be locked in position by any suitable means, such as nylon plugs extending across the threaded portion. For replacement, the option is thus provided for replacing an entire plate 37 with the series of spikes 35, or replacement of individual spikes by use of a wrench on the individual hex-head 40.

As best illustrated in FIGS. 4 and 4a, at least one spike 35 of each of the gang mounted spikes on the longitudinal plates 37 form a circular row, which is mated with the openings in the links of the individual chains 36. The pitch of the row of spikes and the distance between each adjacent opening of the matching chain is approximately 1.5 inches. This spacing has proven to give reliable pick-up, even when relatively small trash is present. As the drum assembly 11 is driven forward, each chain is pulled along by its engagement with the outer circumferential surface and by its mating relationship with the spikes 35. The preferred form of the chain includes a substantially square link configuration. These interconnected links have substantially flat side pieces 45 positioned on opposite sides of the corresponding spike 35 and with a hinge 46 on each end.

The hinges 46 thus allow each chain 36 to match the outer circumferential surface of the drum assembly 11. Also, they are generally aligned with the corresponding junctures between adjacent elongated plates 37 (see FIG. 4a). The flat side pieces 45 and the mating relationship allows the chain 36 to firmly lift the trash from underneath, thereby more effectively stripping the trash from the spike or spikes 35 and then more efficiently conveying the trash away for collection. It has been found that even the smallest pieces of trash can be picked-up and efficiently stripped from the spikes 35 with this arrangement.

To further explain, and as best illustrated in FIG. 5, trash T, such as newspaper, plastic bottles and cups, aluminum cans, fast food boxes, wrappers and the like, resting on the grass surface of the ground G, is located in the path to be cleared. As the tractor T pulls the pick-up/collection apparatus 10 forwardly, as noted by the action arrow F (see also FIG. 2), the drum assembly 11 with the spikes 35 move over and into contact with the trash T, whereupon it is crushed by the weight of the drum assembly 11 and impaled by one or more spikes. As the ground G is cleared, the trash $T_1$, $T_2$ is now firmly captured on the spikes and continues around the periphery as is lifted upwardly. The drum assembly 11 is moving in the clockwise direction of the rotational arrow R in this figure.

At about the 12 o'clock position in FIG. 5, the chain 36 moves away from the outer peripheral surface in the direction of an idler roller 50. As this happens, the chain along this delivery run advantageously forms a conveyor for positively moving the trash $T_3$, $T_4$ in the direction of the collection bin 21. As the distal end of the delivery run of the chain 36 reaches its apex point on the idler guide roller 50, the next in line trash $T_5$ is pushed clear and over a transfer chute 51 formed on an upstanding portion of the frame 12. Trash $T_6$, $T_7$ is shown being deposited in the collection bin 21 where residual trash $T_n$ is already collected. The chain 36 is directed on a return run for mating again with the drum assembly 11 at approximately the 3 o'clock position so that the pick-up operation can remain continuous.

As illustrated in FIG. 6, the drum assembly 11 is made in two or more sections that are identical to that shown in FIG. 3a. Thus, the sections moving at different speeds of S, $S_1$, $S_2$, $S_n$ allows the drum assembly 11 to negotiate a turn without undue slippage. The section of the drum assembly 11 on the inside of the turn rotates at the least speed S, the next section rotates at an increased speed $S_1$, and the outside section in the direction of the turn rotates at a second increased speed $S_2$. In this manner, the drum assembly is highly maneuverable and can be easily positioned by the operator to provide maximum trash pick-up/collection during a work session.

Referring now to FIG. 7, another feature of the invention allows the trash $T_n$ to be easily removed for disposal. For this purpose, an opening, generally designated by the reference numeral 60 is provided in one end of the collection bin 21. A door 61 is mounted for upward sliding movement, as shown by the dotted line outline of FIG. 3 in order to expose the trash $T_n$ to the opening 60. A collar 62 is attached to the outside of the bin 21 around the opening 60 and includes an outer rim 63, which is designed to seat an elastic band 64. When the trash $T_n$ is ready to be removed from the bin, a plastic trash bag B, such as a standard 40-gallon trash bag, is connected to the collar and fastened into position by the elastic band 64. A rake or other suitable implement is used to pull the trash $T_n$ in the direction of the arrow $T_x$, the bag is removed, closed, tied and dropped for later pick-up.

In accordance with the related method of the trash pick-up and collection system of the present invention, the rotary drum assembly 11 is moved along the path to be cleared. During movement, the plurality of spikes act to impale and pick-up the trash $T-T_n$, thus clearing the path. The next step of the method is wrapping the continuous chain mechanism 36 around the drum assembly 11, in the manner shown in FIGS. 3a, 4 and 5. With the chain mechanism in position, there is a lifting, stripping and carrying or conveying of the trash from the spikes 35 (see FIG. 5). Finally, the step of collecting the trash carried by the chain mechanism is accomplished by the conveyor bin 21, also shown in FIG. 5.

In the preferred method of the invention, a plurality of individual chains 36 is utilized. The chains are guided away from the drum in such a manner as to provide the steps of lifting, stripping and carrying of the trash for collecting. The step of collecting the trash includes depositing into the bin, and then ultimately moving the trash through an opening in the side of the bin directly into a plastic trash bag. In order to avoid broken glass where people are present, glass items are manually picked-up by the operator immediately before reaching the drum by use of the retriever wand 22, as shown in FIG. 1.

In summary, it will now be realized that substantial results and advantages are obtained by the trash pick-up/collection apparatus 10 and the related method of the present invention. The drum assembly 11 efficiently picks up the trash $T-T_n$ by being impaled with the plurality of spikes 35. A continuous chain mechanism wraps around the outer circumferential surface with the openings of the chains mating with the spikes 35. An idler roller 50 moves the chains 36 away from the surface of the drum to provide a positive lifting of the trash $T-T_n$ from underneath. This action provides a more effective and positive stripping from the spikes 35 and carrying or conveying to the collection bin 21. The drum assembly 11 is in sections so that turns can be easily negotiated (see FIG. 6). Also, as the drum assembly 11 moves along sodded ground, the soil is aerated providing an additional benefit to the pick-up/collection operation.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. A trash pick-up and collection apparatus for travel along a path to be cleared comprising:

a rotary drum assembly having a length along a longitudinal axis and having a plurality of spikes therearound defining a trash pick-up area to impale and pick-up trash along said path;

a flexible continuous trash removing mechanism wrapped around the drum assembly which extends substantially along said length at least in the pick-up area, for lifting, stripping and carrying the trash from the spikes; and a collection bin for receiving the trash carried by the removing mechanism, whereby the trash is picked-up, lifted, stripped and carried for collection in a positive manner.

2. The trash pick-up and collection apparatus of claim 1, wherein said drum assembly includes a plurality of sections extending along said longitudinal axis substantially perpendicular to the path of travel to allow movement of the sections at differential speeds in a turn.

3. The trash pick-up and collection apparatus of claim 1, wherein said drum assembly includes a plurality of elongated plates extending longitudinally along the axis of said drum assembly for forming the outer peripheral surface and mounting a longitudinal series of said spikes, and wherein said removing mechanism includes a plurality of chains spaced along the length of said drum assembly.

4. The trash pick-up and collection apparatus of claim 3, wherein each chain includes interconnected links extending around the peripheral surface of said drum assembly, each link having an opening adapted to fit around a base of a corresponding spike during the pick-up operation, at least one spike of each series aligned to form a circular row for receiving each chain; and said removing mechanism includes a guide spaced from said drum assembly to direct said chains away from said peripheral surface, wherein a portion of said chains forms a delivery run which extends from said drum assembly to said guide.

5. The trash pick-up and collection apparatus of claim 4, wherein said collection bin extends adjacent the distal end of the delivery run of the chains coming from the drum to receive the trash.

6. The trash pick-up and collection apparatus of claim 5, wherein said guide is provided by an idler roller extending parallel to said drum to define the distal end of the delivery run.

7. The trash pick-up and collection apparatus of claim 1, further comprising a frame to support said drum assembly, and means to raise said frame to provide clearance for said drum assembly upon approaching an obstacle.

8. The trash pick-up and collection apparatus of claim 7, wherein said raising means includes spaced pivotal swing arms, auxiliary wheels carried by said arms, and a hydraulic actuator for each arm.

9. The trash pick-up and collection apparatus of claim 1, wherein said bin includes an opening for removal of said trash and a door for closing the opening during the pick-up operation.

10. The trash pick-up and collection apparatus of claim 9, further comprising a collar having a rim around said opening on the outside of said bin, and an elastic band for attachment of a bag to the collar to receive the trash and for retention of the bag by the rim.

11. The trash pick-up and collection apparatus of claim 3, wherein each chain includes interconnected links extending around the peripheral surface of said drum assembly, each link having an opening for receiving said spikes and including substantially flat side pieces and hinged cross members to provide increased uplift to strip the trash from the spikes.

12. The trash pick-up and collection apparatus of claim 4, wherein the pitch of the spikes along the circular rows and the distance between each adjacent opening of the chain are the same length, and are approximately 1.5 inches.

13. The trash pick-up and collection apparatus of claim 2, wherein each drum section is mounted for substantially free rotation on bearings carried on a single stationary shaft.

14. The trash pick-up and collection apparatus of claim 13, wherein said shaft is steel and is approximately two inches in diameter to resist flexing under load during operation.

15. The trash pick-up and collection apparatus of claim 1, wherein the spikes on said drum assembly have sufficient length to extend down into the sod along said path to provide aeration thereof during operation.

16. The trash pick-up and collection apparatus of claim 5, further comprising a chute adjacent said guide to transfer the trash coming from the distal end of said delivery run and into said collection bin.

17. The method of trash pick-up and collection while traveling along a path to be cleared comprising the steps of:

moving a rotary drum assembly around a longitudinal axis wherein said drum assembly has a length along said longitudinal axis and having a plurality of spikes on the outer peripheral surface defining a trash pick-up area to impale and pick-up trash along said path;

moving a flexible continuous trash removing mechanism which is wrapped around the peripheral surface of the drum assembly wherein said trash removing mechanism extends substantially along said length at least in the pick-up area;

lifting, stripping, and carrying the trash from the spikes by said trash removing mechanism; and collecting the trash carried by said trash removing mechanism;

whereby the trash is picked-up, lifted, stripped and carried for collection in a positive manner.

18. The method of trash pick-up and collection as set forth in claim 17, including the further steps of:

providing a plurality of chains for said removing mechanism, and guiding said chains away from said drum assembly to provide the steps of lifting, stripping and carrying said trash for collecting.

19. The method of trash pick-up and collection as set forth in claim 18, wherein the step of collecting said trash includes dropping into a bin after being carried away from said drum assembly and moving said trash through an opening in a side of said bin directly into a plastic bag.

20. The method of trash pick-up and collection as set forth in claim 17, including the further step of:

manually picking-up glass items along the path immediately before reaching said drum assembly.

* * * * *